(12) United States Patent
Jeon (10) Patent No.: US 12,182,341 B2
(45) Date of Patent: Dec. 31, 2024

(54) SEPARATED KEYBOARD AND METHOD FOR CHANGING KEYBOARD LAYOUT FOR EACH COMMUNICATION CONNECTION

(71) Applicant: Hyeon Gi Jeon, Cheongju-si (UA)

(72) Inventor: Hyeon Gi Jeon, Cheongju-si (UA)

( * ) Notice: Subject to any disclaimer, the term of this patent is extended or adjusted under 35 U.S.C. 154(b) by 0 days.

(21) Appl. No.: 18/043,089

(22) PCT Filed: Jul. 12, 2021

(86) PCT No.: PCT/KR2021/008909
§ 371 (c)(1),
(2) Date: Feb. 27, 2023

(87) PCT Pub. No.: WO2022/045577
PCT Pub. Date: Mar. 3, 2022

(65) Prior Publication Data
US 2024/0012490 A1   Jan. 11, 2024

(30) Foreign Application Priority Data
Aug. 27, 2020  (KR) .................. 10-2020-0108349

(51) Int. Cl.
*G06F 3/023* (2006.01)
*G06F 3/02* (2006.01)
*H01H 13/83* (2006.01)
*H01H 13/86* (2006.01)

(52) U.S. Cl.
CPC .......... *G06F 3/0231* (2013.01); *G06F 3/0213* (2013.01); *G06F 3/0216* (2013.01); *G06F 3/0219* (2013.01); *H01H 13/83* (2013.01); *H01H 13/86* (2013.01); *H01H 2223/05* (2013.01)

(58) Field of Classification Search
CPC .... G06F 3/0231; G06F 3/0213; G06F 3/0216; G06F 3/0219; H01H 13/83; H01H 13/86; H01H 2223/05
See application file for complete search history.

(56) References Cited

U.S. PATENT DOCUMENTS

| 2004/0069600 | A1* | 4/2004 | Xie | G06F 3/0233 200/5 R |
| 2005/0057508 | A1* | 3/2005 | Kim | G06F 3/0219 345/163 |
| 2017/0139588 | A1 | 5/2017 | Wu et al. | |

FOREIGN PATENT DOCUMENTS

| DE | 102018108583 A1 * | 10/2018 | ............... G06F 3/02 |
| KR | 20020078308 A | 10/2002 | |
| KR | 20070059831 A | 6/2007 | |
| KR | 20080021625 A | 3/2008 | |
| KR | 20140034156 A | 3/2014 | |
| KR | 20180070420 A | 6/2018 | |
| KR | 102097582 B1 | 4/2020 | |
| WO | 2007005115 A2 | 1/2007 | |

(Continued)

*Primary Examiner* — Lisa S Landis
(74) *Attorney, Agent, or Firm* — Grossman, Tucker, Perreault & Pfleger, PLLC; Donald J. Perreault (57) ABSTRACT

Separated keyboard and method for changing keyboard layout for each communication connection disclosed. The separated keyboard device includes a main keyboard unit connected to a digital processing device by wire or wirelessly and a sub keyboard unit physically separated from the main keyboard unit and connected to the main keyboard unit by wire or wirelessly.

11 Claims, 9 Drawing Sheets

(56) References Cited

FOREIGN PATENT DOCUMENTS

| WO | WO-2007013095 A2 | * | 2/2007 | ........... G06F 3/0216 |
| WO | 2012106776 A1 | | 8/2012 | |

* cited by examiner

FIG. 1

Prior Art

SEPARATED KEYBOARD AND METHOD FOR CHANGING KEYBOARD LAYOUT FOR EACH COMMUNICATION CONNECTION

TECHNICAL FIELD

The present invention relates to separated keyboard and method for changing keyboard layout for each communication connection.

BACKGROUND ART

In order to improve user convenience and work efficiency, various digital processing devices such as personal computers, tablet PCs, laptop computers, and smart phones are being used. These digital processing devices are connected to a wired keyboard or a wireless keyboard for data input.

In the case of the wired keyboard, the limited length of the cable might limit a user to freely change the position of the keyboard and use it. In order to eliminate such inconvenience, the wireless keyboard that is wirelessly connected to the digital processing device by use of a short-range wireless communication method has been widely used in recent years.

Figure 1:
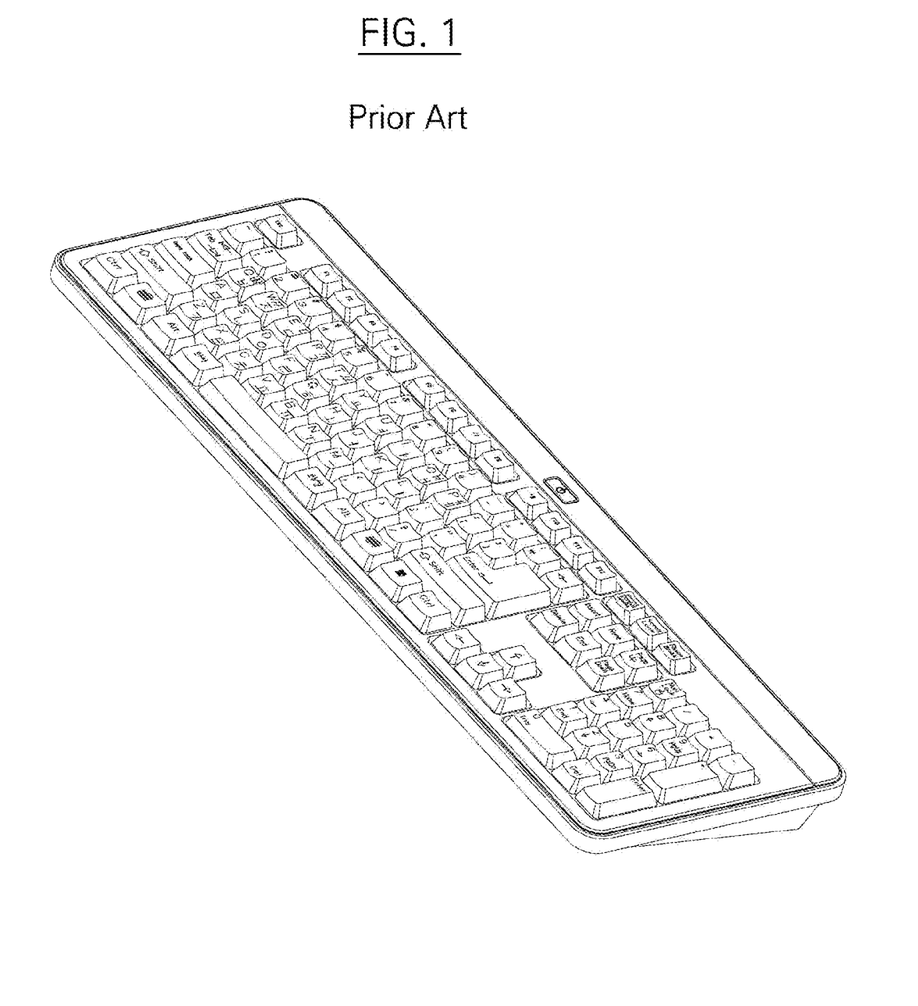
FIG. 1 illustrates a conventional keyboard.

As illustrated in FIG. 1, unlike the wired keyboard, the wireless keyboard does not have a cable for connection, but like a wired keyboard, dozens of keys are arranged in rows and columns on a single board extending a predetermined length.

Types of keys arranged include alphabet keys (including number keys and symbol keys), function keys (keys for executing specific predefined functions, such as F1 to F12 keys), combination keys (e.g., keys such as the shift key, alt key, and control key used to call up the special function in combination with other keys), navigation keys (e.g., keys that move the cursor such as page up key, page down key, arrow keys, etc.), special keys (e.g., keys that provide convenience when entering text such as insert keys, backspace keys, number lock keys, caps lock keys, Korean/English conversion keys, etc.), system command keys (e.g., Keys that issue specific commands to the operating system, such as the escape key), and so on.

The key layout of the wireless keyboard is that the special keys, the navigation keys and the numeric keypad occupy the right area of the wireless keyboard, and the alphabet keys are arranged mainly in the left and center areas of the wireless keyboard.

For this reason, a user must slightly bend both wrists to put the designated fingers of the left and right hands on the reference positions among character keys (ie, S key, D key, F key, J key, K key, and L key) respectively. However, such a posture in which the wrist is forcibly bended may cause various diseases since the wrist does not remain naturally bended.

In addition, since conventional keyboard is implemented separately from a mouse, in order to manipulate a mouse pointer at the same time, the user moves his hand located on the keyboard to grip and manipulate the mouse, and then place the hand back on the keyboard, and these steps should be repeated. In these steps, longer input time might lower the user's concentration, and the wrist and the elbow might be strained.

DISCLOSURE OF INVENTION

Technical Problem

It is intended to provide a separated keyboard and a method for changing keyboard layout for each communication connection that allow the user to place a main keyboard unit and a sub keyboard for the most comfortable wrist angles and to minimize the movements of wrist during the input by ergonomically arranging keys and touchpad to maintain health of user's joint as well as to improve work efficiency.

It is also intended to provide a separated keyboard and a method for changing keyboard layout for each communication connection that allow the user to use the main keyboard unit by one hand (one-handed mode) or the main keyboard unit and the sub keyboard unit by both hands (two-handed mode) and maximize user convenience by adaptively changing keyboard layout in one-handed mode and two-handed mode.

It is also intended to provide a separated keyboard and a method for changing keyboard layout that secure work stability as well as the user's work convenience by allowing an arrangement (that is, relative positions and rotation angles of the main keyboard unit and the sub keyboard unit) of keyboard selected by the user to be held by use of a holding member.

Objects other than the foregoing will be easily understood through the following description.

Solution to Problem

According to one aspect of the present invention, a separated keyboard device provided. The separated keyboard device may include a main keyboard unit connected to an digital processing device by wire or wirelessly and a sub keyboard unit physically separated from the main keyboard unit and connected to the main keyboard unit by wire or wirelessly, wherein a keyboard layout for an operation in one-handed mode is applied when the sub keyboard unit is not connected while the main keyboard unit is connected to the digital processing device, wherein a keyboard layout for an operation in two-handed mode is applied to the main keyboard unit and the sub keyboard unit when the sub keyboard unit is connected while the main keyboard unit is connected to the digital processing device.

The keys of the main keyboard unit may be arranged to form a plurality of blocks when the main keyboard unit corresponds to the user's right hand, wherein the plurality of blocks may include a main block consisting of a plurality of keys, a first outer block consisting of a plurality of keys, arranged adjacent to the right side of the main block at a lower side relatively closer to the user side than the main block, a second outer block consisting of a plurality of keys, arranged adjacent to the right side of the first outer block at a lower side relative to the first outer block, an inner block consisting of a plurality of keys, arranged adjacent to the left side of the main block at a lower side relative to the main block, and a lower block consisting of a plurality of keys, arranged at lower sides of the inner block and the main block, wherein the plurality of keys corresponding to a movement path of a thumb may be arranged in a curved shape, wherein a touchpad may be arranged below the main block and the first outer block and on the left side of the lower block.

An arrangement of keys and touchpad of the sub keyboard unit may be in a form in which the main keyboard unit is mirrored when the sub keyboard unit corresponds to the user's left hand An e-paper display for displaying an operation allocated to a corresponding key according to the applied keyboard layout may be arranged on a surface of each key.

A display for displaying an operation status and a setting status of the main keyboard unit or the sub keyboard unit may be arranged in an area that does not interfere with the keys and the touchpad.

The main keyboard unit may recognize a change in a relative contact position of a user's fingers in contact with the touchpad of the main keyboard unit and the touchpad of the sub keyboard unit respectively as a manipulation gesture and transmit manipulation data to the digital processing device.

Selection information and deselection information for an input selection key and a combination key in any one of the main keyboard unit and the sub keyboard unit may be preset to be shared with the other.

A relative position and a relative rotation angle of the main keyboard unit and the sub keyboard unit may be held using a holding member.

The holding member may be at least one of an arc-shaped bar and an articulated bar.

Each of the main keyboard unit and the sub keyboard unit may be coupled to the holding member so as to slide along a path formed in the holding member to a position to be held.

The main keyboard unit may operate in an advertising mode for establishing a wireless connection with the sub keyboard unit, and integrate manipulation data received from the sub keyboard unit with manipulation data generated by the main keyboard unit to transmit to the digital processing device.

The main keyboard unit may receive the keyboard layout from the digital processing device and provides the keyboard layout to the sub keyboard unit.

According to another aspect of the present invention, a computer program stored in a main keyboard unit for executing a method for changing keyboard layout for each communication connection of a keyboard device provided. The computer program instructs the main keyboard unit to connect to an digital processing device by wire or wirelessly, determine whether a sub keyboard unit is connected, apply a keyboard layout for an operation in one-handed mode when the sub keyboard unit is not connected, and apply a keyboard layout for an operation in two-handed mode in relation to the sub keyboard unit when the sub keyboard unit is connected.

Other aspects, features and benefits other than the foregoing will be clarified from the drawings below, the scope of patent claims, and the detailed description of the invention.

Advantageous Effects of Invention

According to an embodiment of the present invention, it is advantageous that the user can place a main keyboard unit and a sub keyboard for the most comfortable wrist angles and the movements of wrist during the input can be minimized by ergonomically arranging keys and touchpad to maintain health of user's joint as well as to improve work efficiency.

According to an embodiment of the present invention, it is also advantageous that the user convenience can be maximized by using the main keyboard unit by one hand (one-handed mode) or the main keyboard unit and the sub keyboard unit by both hands (two-handed mode) and by adaptively changing keyboard layout in one-handed mode and two-handed mode.

According to an embodiment of the present invention, it is also advantageous that work stability as well as the user's work convenience can be secured by allowing the arrangement (that is, relative positions and rotation angles of the main keyboard unit and the sub keyboard unit) of keyboard selected by the user to be held by use of the holding member.

BEST MODE FOR CARRYING OUT THE INVENTION

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

In the specification, an embodiment in which a digital processing device and a keyboard device are wirelessly connected will be mainly described, but it should be understood that the digital processing device and the keyboard device can be connected even by wire.

Figure 2:
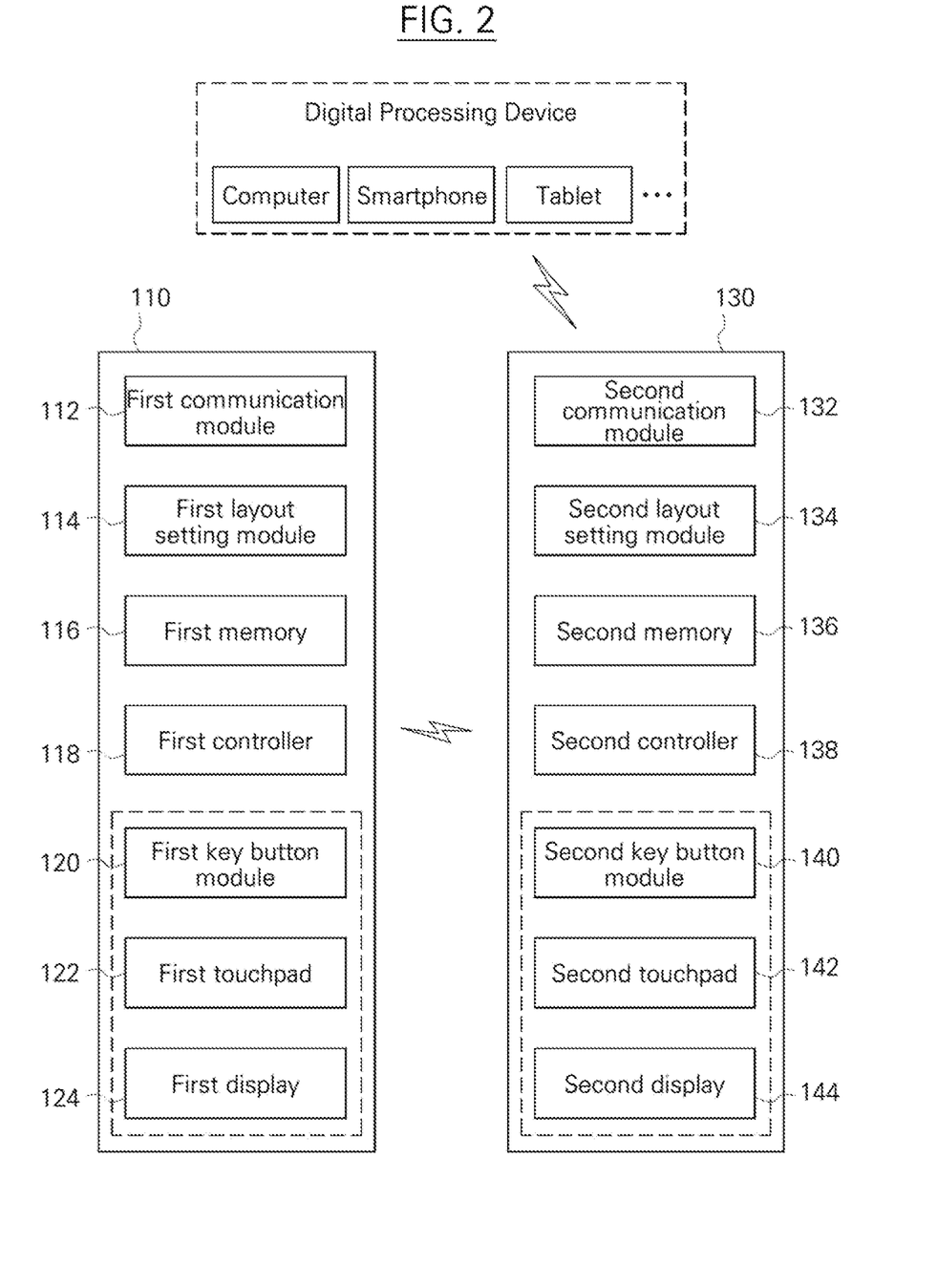
FIG. 2 is a block diagram of a wireless keyboard device according to one embodiment of the present invention.
Figure 3:
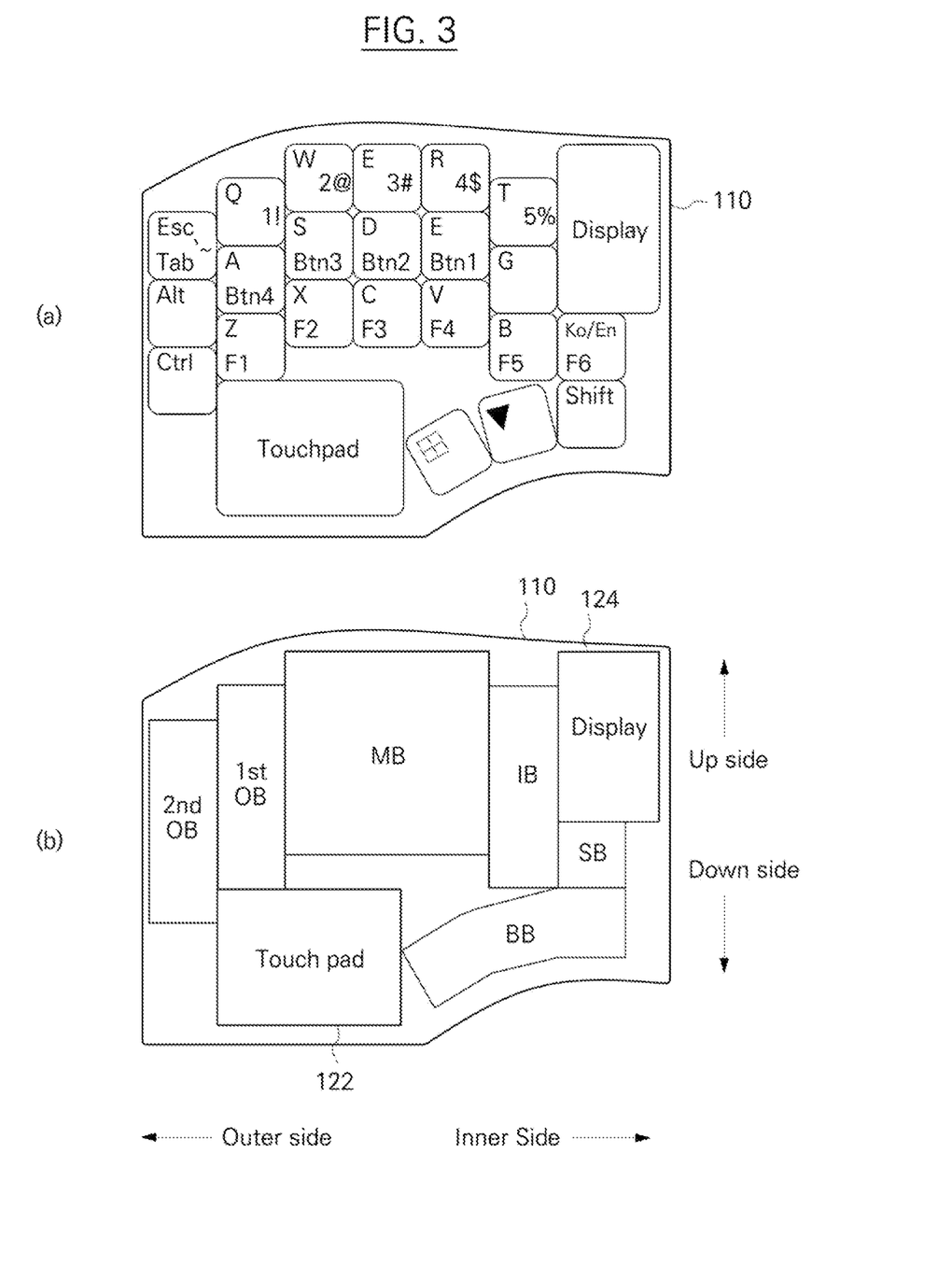
FIG. 3 illustrates a first keyboard unit according to one embodiment of the present invention.
Figure 4:
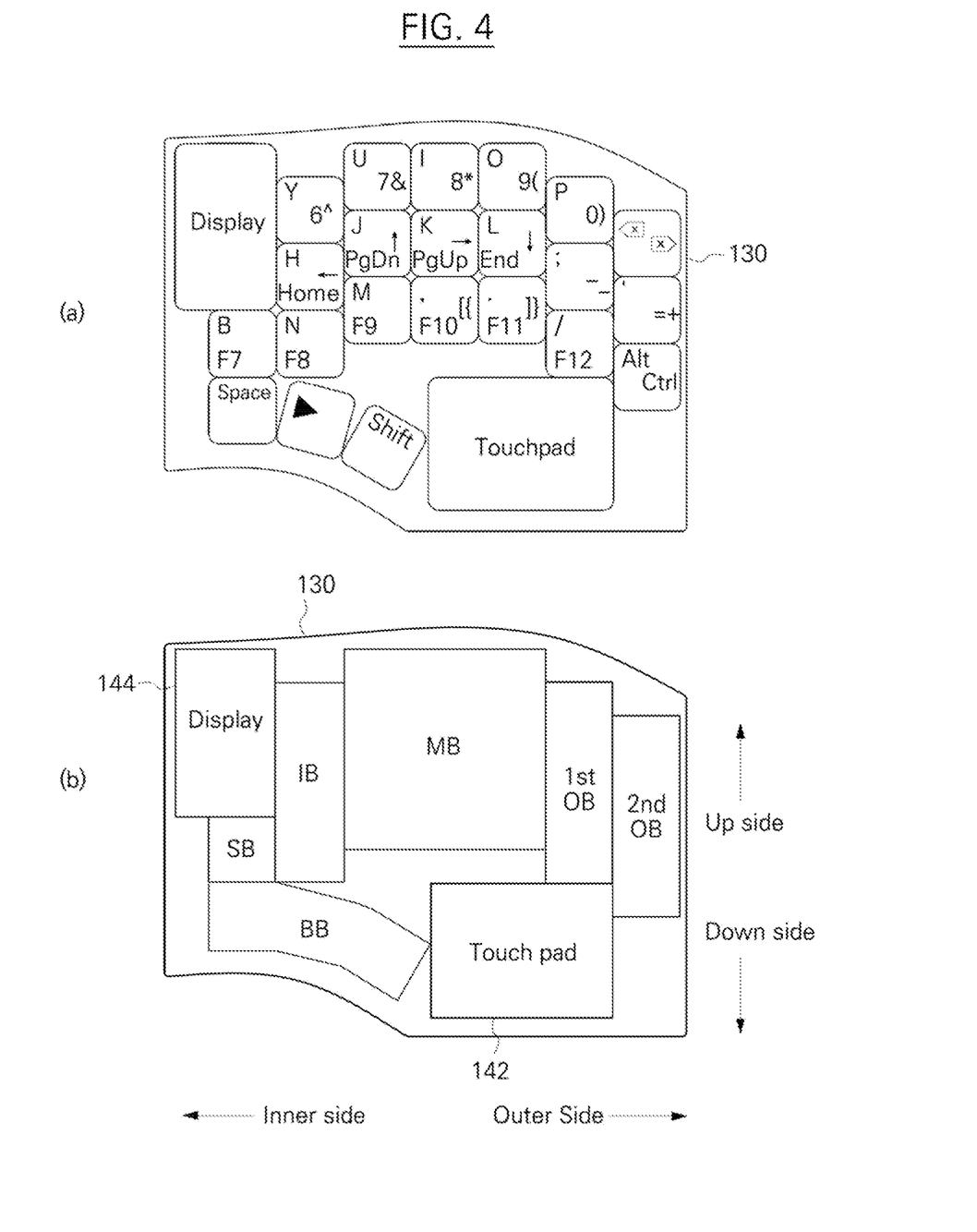
FIG. 4 illustrates a second keyboard unit according to one embodiment of the present invention.
Figure 5:
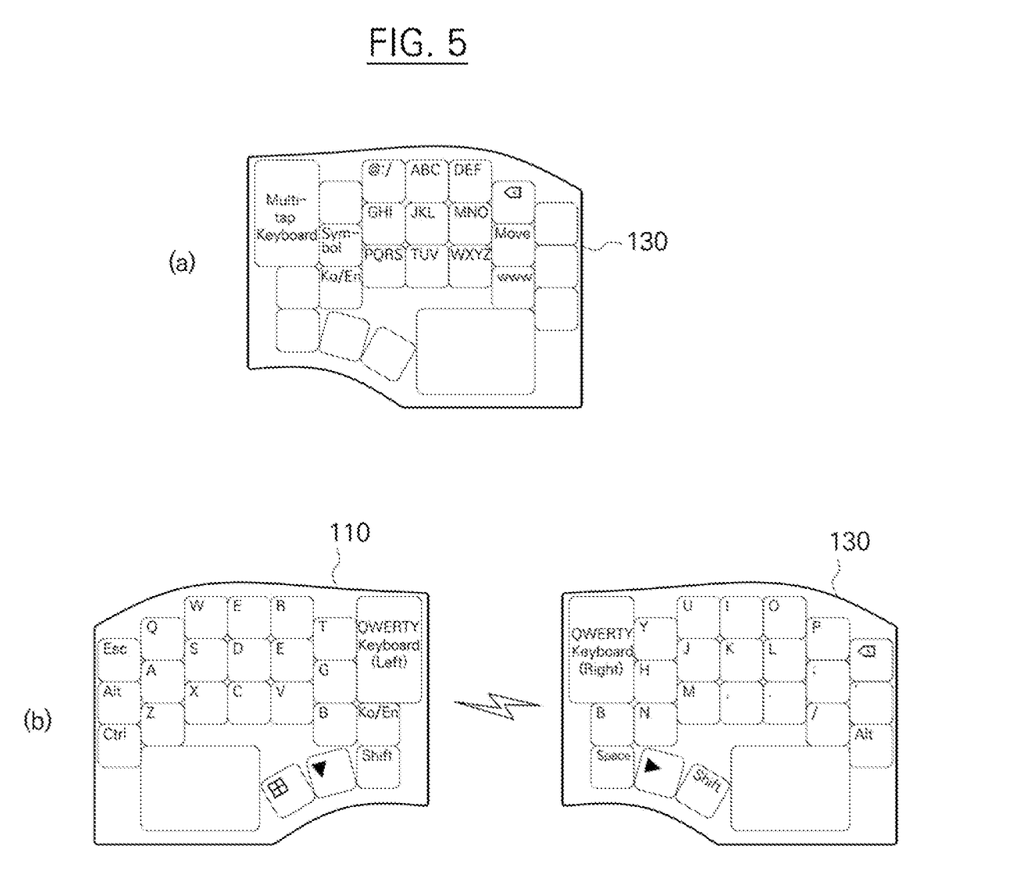
FIG. 5 illustrates a change of keyboard layout for each communication connection of the wireless keyboard device according to one embodiment of the present invention.
Figure 6:
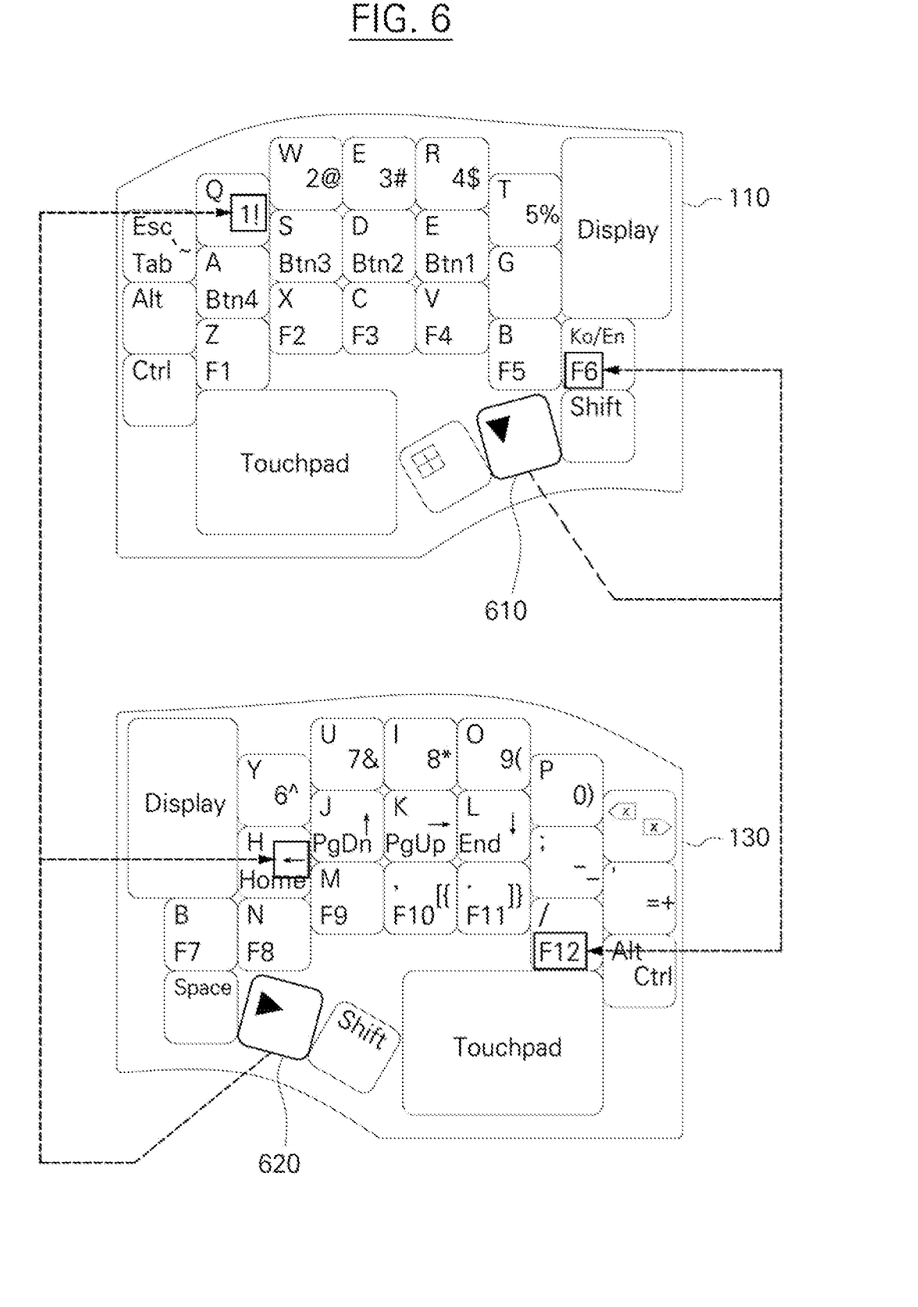
FIG. 6 illustrates different operations of each key according to selection of each input selection key according to one embodiment of the present invention.
Figure 7:
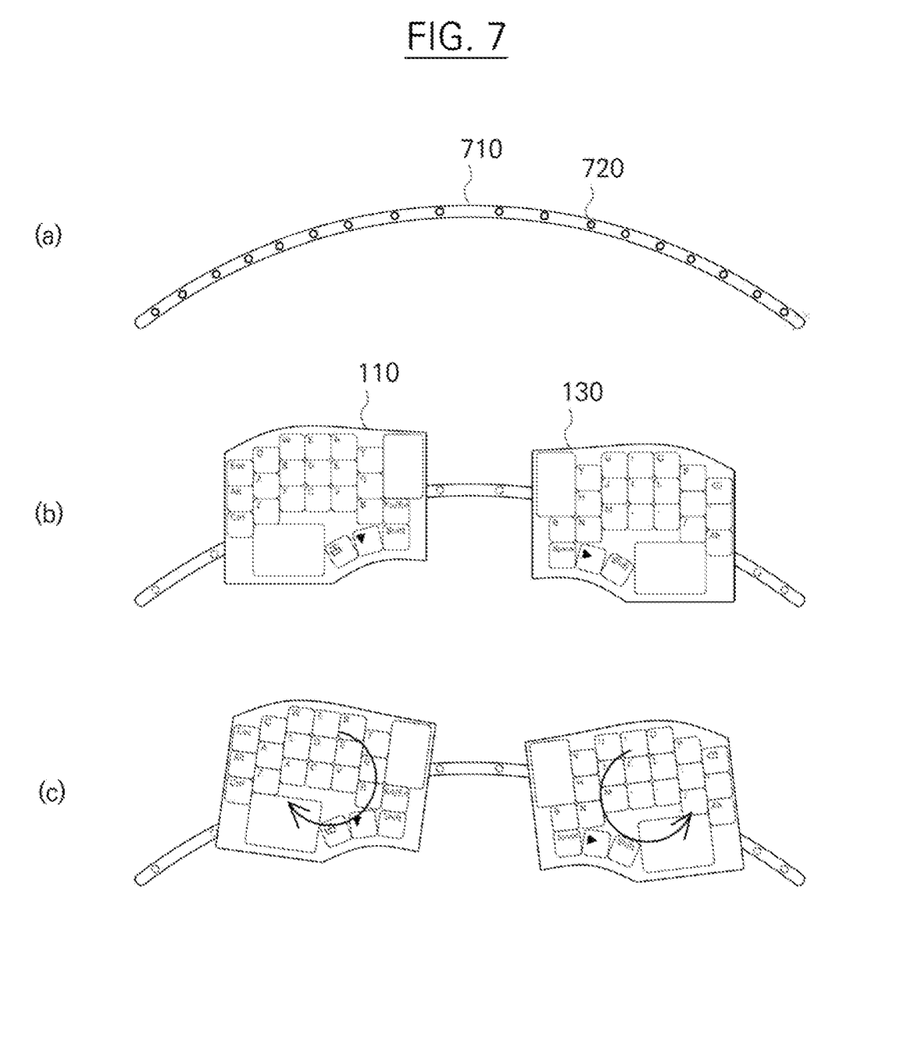
FIG. 7, FIG. 8 and FIG. 9 illustrate a holding member for holding the arrangement of the wireless keyboard according to one embodiment of the present invention.
Figure 8:
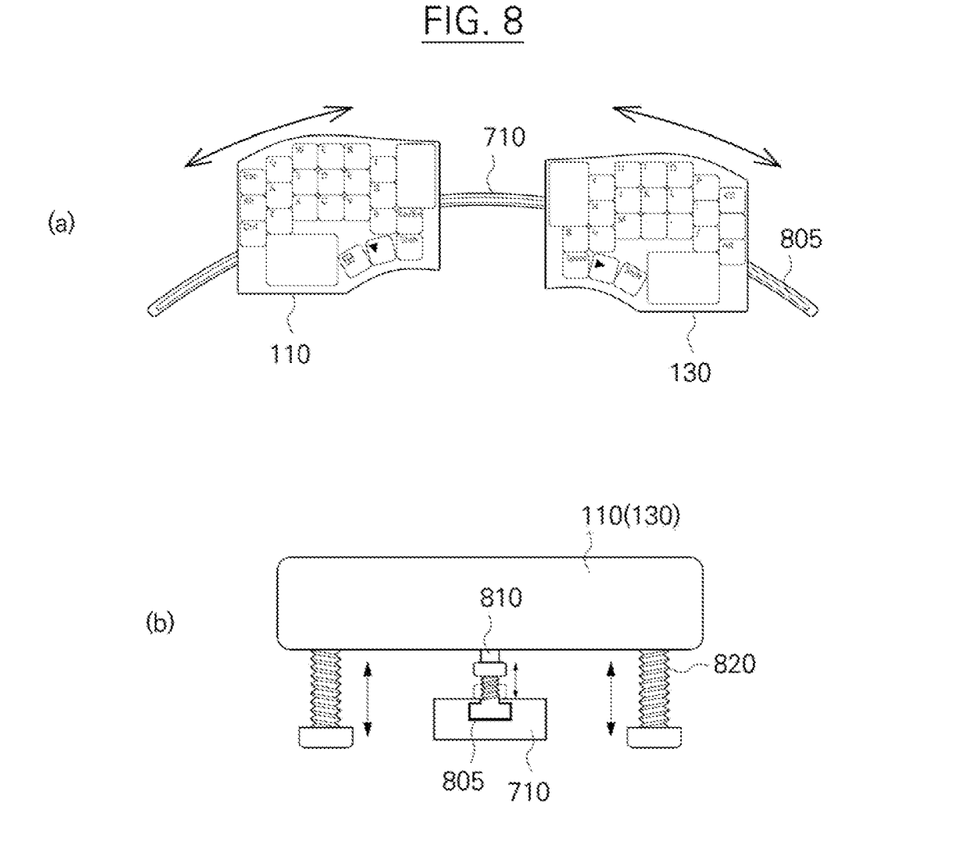
Figure 9:
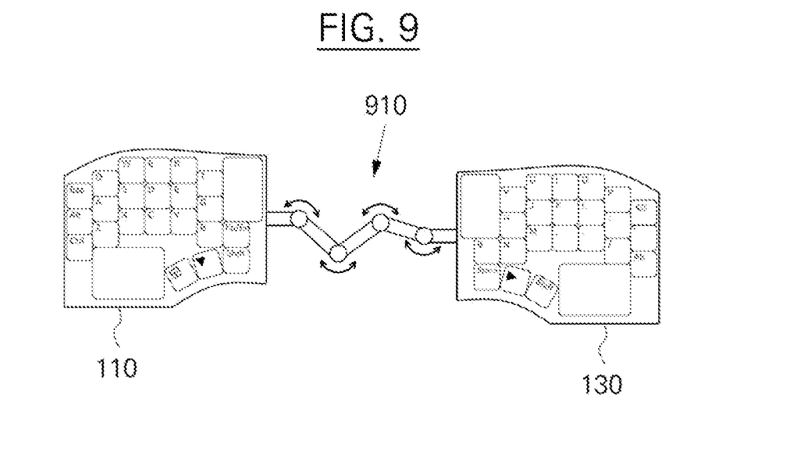

FIG. 2 is a block diagram of a wireless keyboard device according to one embodiment of the present invention, FIG. 3 illustrates a first keyboard unit according to one embodiment of the present invention, and FIG. 4 illustrates a second keyboard unit according to one embodiment of the present invention. FIG. 5 illustrates a change of keyboard layout for each communication connection of the wireless keyboard device according to one embodiment of the present invention, FIG. 6 illustrates different operations of each key according to selection of each input selection key according to one embodiment of the present invention, and FIG. 7, FIG. 8 and FIG. 9 illustrate a holding member for holding the arrangement of the wireless keyboard according to one embodiment of the present invention.

Referring to FIG. 2, a wireless keyboard device wirelessly connected to a digital processing device to provide key stroke data may include a first keyboard unit 110 and a second keyboard unit 130. Of course, it should be understood that the wireless keyboard device may consist of three or more keyboard units as needed. The digital processing device may be, for example, a computer, a smart phone, or a digital broadcasting terminal, which has a communication function configured of receiving key stroke data from a wireless keyboard device.

When the wireless keyboard device according to one embodiment is wirelessly connected to the digital processing device, only one of the first keyboard unit 110 and the second keyboard unit 130 is directly wirelessly connected to the digital processing device as a main keyboard unit, and the other can be connected to the main keyboard unit by wireless or wired connection as a sub keyboard unit. The main keyboard unit transmits a manipulation data received from the sub keyboard unit to the digital processing device.

The first and second keyboard units 110, 130 may be set to operate in an independent one-handed mode, and the first and second keyboard units 110, 130 as a whole may be set to operate in a two-handed mode. It can also be set to work. A keyboard layout to be applied in each mode may be preset so that each keyboard unit can properly operate in one-handed mode or two-handed mode.

Of course, depending on the user's manipulation, each of the main keyboard unit and the sub keyboard unit may be set to operate in one-handed mode. For example, the main keyboard unit may use a multi-tap keypad layout, which is a standard E.161 keypad operating in one-handed mode, and a sub keyboard unit may use a numeric keypad operating in one-handed mode.

In addition, in order to allow a plurality of keyboard units to be individually connected to one single digital processing device so that a plurality of users can separately manipulate the digital processing device, it is possible that each of the first keyboard unit 110 and the second keyboard unit 130 may be wirelessly connected to the digital processing device individually.

Hereinafter, with reference to FIGS. 2 through 9, only the main keyboard unit is wirelessly connected directly to the digital processing device, and the sub keyboard unit is operated by wired or wireless connection to the main keyboard unit.

The main keyboard unit, which is wirelessly connected directly to the digital processing device, may be designated by the user as either of the first keyboard unit 110 and the second keyboard unit 130, or the second keyboard unit 130 corresponding to the right hand may be designated as the main keyboard unit by default (see FIG. 4).

Alternatively, when a communication between the digital processing device and the keyboard device is established, a keyboard unit that is first communicated with the digital processing device among the first and second keyboard units 110, 130 of the keyboard device may be set as the main keyboard unit. In this case, the main keyboard unit, which is first communicated with the digital processing device, operates in an advertising mode so that another keyboard unit can access the main keyboard unit as a sub keyboard unit. In this way, one keyboard unit directly connected to the digital processing device operates as the main keyboard unit, the other keyboard unit connected to the main keyboard unit operates as the sub keyboard unit, and the main keyboard unit processes (e.g., integrate, modulate, etc.) key stroke data received from the sub keyboard unit to transmit to the digital processing device.

When the main keyboard unit only is wirelessly connected to the digital processing device and the sub keyboard unit is not wirelessly connected to the main keyboard unit, the main keyboard unit may be set to apply a keyboard layout for one-handed mode. Thereafter, when the sub keyboard unit is wirelessly connected to the main keyboard unit, a keyboard layout for two-hand mode may be applied throughout the main keyboard unit and the sub keyboard unit.

Hereinafter, for convenience of explanation, a case in which the second keyboard unit 130 corresponding to the right hand is designated as the main keyboard unit will be described.

The first keyboard unit 110 may include a first communication module 112, a first layout setting module 114, a first memory 116, a first controller 118, a first key button module 120, a first touchpad 122 and the first display 124.

Likewise, the second keyboard unit 130 may include a second communication module 132, a second layout setting module 134, a second memory 136, a second controller 138, a second key button module 140, a second touchpad 142 and a second display 144.

The second communication module 132 and other modules in the second keyboard unit 130 so as to correspond to the first communication module 112 and other modules in the first keyboard unit 110 performs operations corresponding to each other. Therefore, for convenience of explanation, for corresponding modules in each of the first keyboard unit 110 and the second keyboard unit 130, the second keyboard unit 130 as the main keyboard unit will be mainly described. However, when operation of module in the first keyboard unit 110 is different from corresponding module in the second keyboard unit 130 and additional description is required, it will be further described.

The second communication module 132 of the second keyboard unit 130 communicates with the digital processing device through a wireless communication (e.g., Bluetooth, infrared communication, home radio frequency (RF), wireless LAN, etc.), and communicates with the first communication module 112 of the first keyboard unit 110 through the wired or wireless communication.

The second communication module 132 may receive a new keyboard layout information from the digital processing device or a server on the Internet and store it in the second memory 136. The keyboard layout information is, for example, a logical arrangement information on which letter or function to correspond to each key physically arranged in the first keyboard unit 110 and/or the second keyboard unit 130.

The first communication module 112 of the first keyboard unit 110 may communicate with the second keyboard unit 130, which is the main keyboard unit, and receives the new keyboard layout information and so on through the second keyboard unit 130 to store it in the first memory 116. Of course, as described later, in case that the first keyboard unit 110 is independently connected to the digital processing device, the first communication module 112 may communicate directly with the digital processing device.

The second layout setting module 134 sets the second keyboard unit 130 with a keyboard layout selected by a user from keyboard layout(s) stored in the second memory 136. For example, the user may set the keyboard layout by using a predetermined key among keys provided in the second key button module 140 of the second keyboard unit 130, and at this time, may refer to an operation status information displayed on the second display 144.

The keyboard layout of the first keyboard unit 110 may be set by the second layout setting module 134 of the second keyboard unit 130, but the keyboard layout setting for the first keyboard unit 110 and the second keyboard units 130 may be individually performed in each keyboard unit. In the former case, setting information on the keyboard layout may be transmitted to and shared with the first keyboard unit 110. However, the keyboard layout for a case in which the first keyboard unit 110 operates in one-handed mode may be individually set by the first keyboard unit 110.

In this way, the keyboard layouts for the first keyboard unit 110 and the second keyboard unit 130 may be independently set for each of a case of operating in one-handed mode and a case of operating in two-handed mode. For example, as illustrated in FIG. 5, in the case of one-handed mode, the keyboard layouts such as the multi-tap keypad, Cheon-ji-in (see FIG. 5(*a*)), and a numeric keypad may be applied to each keyboard unit as default, and in the case of two-handed mode, the keyboard layouts such as QWERTY (Refer to (b) of FIG. 5), and DVORAK may be applied as default.

As illustrated in (b) of FIG. 5, in two-hand mode, the first keyboard unit 110 and the second keyboard unit 130 may operate as a keyboard device in combination. That is, keys that were arranged on a single board of the conventional wireless keyboard (see FIG. 1) are dividedly arranged on the first and second keyboard units 110, 130, respectively.

Accordingly, the user can freely arrange and use the first keyboard unit 110 and the second keyboard unit 130 to achieve the most comfortable wrist angle.

Various keyboard layouts may be stored in the second memory 136. The stored keyboard layouts may include, for example, one-handed keyboard layout that can be set in one-handed mode and two-handed keyboard layout that can be set in two-handed mode.

In addition, the keyboard layout stored in the second memory 126 may further include a keyboard layout capable of providing a key that functions differently depending on the operating system of the wirelessly connected digital processing device so as that a key for Windows key used in Windows OS can operate, for example, as Command key in Mac OS or as Home/Menu. It can be understood that a keyboard layout depending on a language of the operating system installed on the digital processing device can be further stored.

The second controller 138 recognizes communication connections established between the second keyboard unit 130 and the digital processing device and the first keyboard unit 110, and the second keyboard unit 130 recognizes the keyboard layout corresponding to the operation mode (e.g., one-handed mode or two-handed mode) of the second keyboard unit 130.

As illustrated in FIG. 5, when the second keyboard unit 130 is wirelessly connected to the digital processing device but not wirelessly connected to the first keyboard unit 110, the second controller 138 may apply the one-handed keyboard layout to the second keyboard unit 130. Thereafter, when the second controller 138 detects a wireless connection to the first keyboard unit 110, the second controller 138 may apply the two-hand keyboard layout to the first keyboard unit 110 and the second keyboard unit 130.

The second controller 138 generates key stroke data corresponding to the key selected by the user on the second key button module 140 according to the applied keyboard layout and transmits the generated key stroke data to the digital processing device. In addition, the second controller 138 may transmit cursor movement data and gesture data (e.g., zoom in/out, etc.) using a second touchpad 142 to the digital processing device.

The second controller 138 may further transmit manipulation data (e.g., key stroke data, cursor movement data, gesture data, etc.) received from the first keyboard unit 110 connected to the digital processing device. To this end, the first controller 118 may generate manipulation data regarding the user's operations with the first keyboard unit 110 and transmit it to the second keyboard unit 130.

The first and second controllers 118, 138 may process manipulation data from each keyboard units to display on the corresponding first and second displays 124, 144.

As illustrated in FIGS. 3 and 4, one or more combination keys (e.g., shift key, alt key, control key, etc.) are arranged on each of the key button modules 120, 140 of the first keyboard unit 110 and the second keyboard unit 130, and these can be used in combination with other keys or when calling up a special function.

When such a combination key is selected or deselected in one of the keyboard units, the first controller 118 or the second controller 138 transmits and shares the key stroke data to the other keyboard, allowing normal operation according to selection or deselection of the combination key.

In addition, as illustrated in FIGS. 3 and 4, each of the key button modules 120, 140 of the first keyboard unit 110 and the second keyboard unit 130 has a preset input selection key (see 610 and 620 of FIG. 6) is placed.

As illustrated in FIG. 6, the input selection keys 610, 620 can specify which operation among a plurality of allocated operations (e.g., operating as alphabet key, operating as function keys (e.g., F1 to F12), operating as navigation key, etc.) is to be performed when the user selects the corresponding key for the plurality of operations.

For example, when J, ↓ and PgDn are assigned to one key, if the user selects the corresponding key button without selecting the input selection keys 610, 620, the second controller 138 will generate key stroke data corresponding to J. But, when the first input selection key 610 is selected and the same key is selected, the second controller 138 will generate key stroke data corresponding to PgDn. On the contrary, when the second input selection key 620 is selected and the same key is selected, the second controller 138 will generate key stroke data corresponding to ↓.

Information on selection or deselection of the input selection keys 610, 620 may be also processed to be transmitted to other keyboard unit and shared with each other.

In this way, in order to allow the separated first and second keyboard units 110, 130 to operate as a single keyboard device as a whole, when the first and second keyboard units 110, 130 operate, information on selection and deselection of a key to be commonly applied is processed to be shared with each other.

The second key button module 140 includes a plurality of keys for generating key stroke data according to a user's selection. Each of the keys may be arranged in a mechanical keypad structure or a touch keypad structure, for example.

A display pad may be attached to the surface of a key so that the user can intuitively recognize the operation content (e.g., key value) of the key according to the keyboard layout currently applied to the second keyboard unit 130. The display pad may be, for example, an e-paper display. Information on the operation of the corresponding key displayed on the display pad may be changed depending on the change of keyboard layout to be applied such as the one-handed mode, the two-handed mode, and the like. Of course, when a user selects any one key, the information on the operation that the selected key will process may be displayed on the second display 144.

A plurality of keys included in the second key button module 140 corresponding to the user's right hand may be arranged to form a plurality of blocks, as illustrated in FIG. 4.

That is, a main block MB consisting of 3×3 keys including J, K, L keys, which are basic positions where the index, middle, and ring fingers of the right hand are located, is arranged, a first outer block $1^{st}$ OB consisting of 1×3 keys is arranged on the right side of the main block MB, and a second outer block $2^{nd}$ OB consisting of 1×3 keys is arranged on the right side of the first outer block $1^{st}$ OB.

The first outer block is adjacent to the main block MB but relatively on the lower side (i.e., close to the user) and the second outer block is adjacent to the first outer block but relatively on the lower side so that the little finger of the right hand moves relatively downward and can easily select the keys arranged on the first and second outer blocks.

An inner block IB consisting of 1×3 keys is arranged on the left side of the main block, and a second display 144 and a spare block SB consisting of one or more keys are arranged on the left side of the inner block. FIG. 4 illustrates a case in which B key common to the first keyboard unit 110 is arranged in the spare block so that alphabet B can be input with the right hand. The information on the operation of the key included in the spare block may be freely set by the user, and if unnecessary, the spare block may be omitted.

The lower block BB is arranged below the main block, the inner block, and the spare block (i.e., relatively closer to the user). The lower block may be arranged to correspond to the thumb of the right hand, and the keys of the lower block may be arranged in a curved shape in consideration of the range of motion of the thumb due to muscles of the right hand.

The second touchpad 142 is arranged on the right side of the lower block and under the main block and the first outer block. The second touchpad 142 is arranged in a position that can be reached by bending the finger in the basic position within the main block.

It is advantageous that the keys of the second key button module 140 and the second touchpad 142 are arranged to allow the right hand to select a key by moving most comfortably and the shortest distance in consideration of the joint movement of the right hand and also to move the mouse cursor by contacting the second touchpad 142 in a state in which the user's right hand is located at the basic position in the main block.

It is also advantageous that the second display 144 is arranged in a position that is not covered when the user selects a key or manipulates the second touchpad 142, so that the user can easily check the operation status, setting status and so on of the second keyboard unit 130 and/or the keyboard device in a state in which the user manipulates the second keyboard unit 130.

Likewise, a plurality of keys included in the first key button module 120 corresponding to the user's left hand may be arranged to form a plurality of blocks, as illustrated in FIG. 3. As illustrated in FIGS. 3 and 4 respectively, the first key button module 120 of the first keyboard unit 110 and the second key button module 140 of the second keyboard unit 130 can be mirrored to each other.

That is, a main block MB consisting of 3×3 keys including J, K, L keys, which are basic positions where the index, middle, and ring fingers of the left hand are located, is arranged, a first outer block $1^{st}$ OB consisting of 1×3 keys is arranged on the left side of the main block MB, and a second outer block $2^{nd}$ OB consisting of 1×3 keys is arranged on the left side of the first outer block $1^{st}$ OB. The first outer block and the second outer block are arranged relatively gradually lower so that the little finger of the left hand moves relatively downward and can easily select the keys arranged on the first and second outer blocks.

An inner block IB consisting of 1×3 keys is arranged on the left side of the main block, and a first display 124 and a spare block SB consisting of one or more keys are arranged on the right side of the inner block.

The lower block BB is arranged below the main block, the inner block, and the spare block. The lower block may be arranged to correspond to the thumb of the left hand, and the keys of the lower block may be arranged in a curved shape in consideration of the range of motion of the thumb due to muscles of the left hand.

The first touchpad 122 is arranged on the left side of the lower block and under the main block and the first outer block. The first touchpad 122 is arranged in a position that can be reached by bending the finger in the basic position within the main block.

It is advantageous that the keys of the first key button module 120 and the first touchpad 122 are arranged to allow the left hand to select a key by moving most comfortably and the shortest distance in consideration of the joint movement of the left hand and also to move the mouse cursor by contacting the first touchpad 122 in a state in which the user's left hand is located at the basic position in the main block.

It is also advantageous that the first display 124 is arranged in a position that is not covered when the user selects a key or manipulates the first touchpad 122, so that the user can easily check the operation status, setting status and so on of the first keyboard unit 110 and/or the keyboard device in a state in which the user manipulates the first keyboard unit 110.

The first touchpad 122 in the first keyboard unit 110 and the second touchpad 142 in the second keyboard unit 130 may be used for manipulation of moving the cursor and to input a manipulation gesture with finger.

The manipulation gesture is for performing a predetermined operation (e.g., zooming in/out) according to the movement of the positions of the fingers in contact with the first or second touchpads 122, 142, for example. Manipulation gesture may be input by contacting a plurality of fingers with any one of the first and second touchpads 122, 142, but the positions of fingers in contact with the first and second touchpads 122, 142, respectively, may be transmitted to the main keyboard unit and may be input by recognizing position change of fingers in contact. For example, if one finger in contact with the first touchpad 122 and the other finger in contact with the second touchpad 142 move so as to narrow the distance between fingers, it may be recognized as a manipulation gesture for zooming out.

The second display 144 may display setting status information (e.g., setting as the main keyboard unit, currently-applied keyboard layout) and operation status information (e.g., key stroke data generated when any of special keys is toggled on, operation due to manipulation gesture (e.g., zoom in, etc.) input from the second touchpad 142), both related to the second keyboard unit 130.

As described above, it is advantageous that the wireless keyboard device according to the present embodiment allows the main keyboard unit to be used alone (one-handed mode) or the main keyboard unit and the sub keyboard unit to be used together (two-handed mode), and the keyboard layout to be adaptively changed in the one-handed mode and the two-handed mode, respectively, thereby maximizing a user convenience.

In addition, the separated main keyboard unit and sub keyboard unit can be arranged to have the most comfortable wrist angle for the user, and keys and touchpads can be ergonomically arranged to minimize wrist movement during the input process, thereby being advantageous of maintaining joint health and improving work efficiency.

In this way, the arrangement of the wireless keyboard tailored to the user's convenience (that is, the relative position and rotation angle of the main keyboard unit and the sub keyboard unit) may be held by the holding member as illustrated in FIGS. 7 through 9.

As illustrated in FIG. 7, the holding member may be an arc-shaped bar 710, and one or more through holes 720 may be formed in the body of the arc-shaped bar 710.

In order for the user to use the keyboard device in the most comfortable posture, the first keyboard unit 110 and the second keyboard unit 130 are positioned above the arc-shaped bar 710 so as to have an appropriate distance between each other (see (b) of FIG. 7). After rotating each of the first and second keyboard units 110 and 130 at rotation angles appropriate to the user's wrists, fastening means such as a screw are passed through the through holes 720 and coupled to each of the first and second keyboard units 110, 130, thereby holding the arrangement of the first and second keyboard units 110, 130. It can be understood that there are a variety of other fastening means for holding the arrangement of the first and second keyboard units 110, 130 using the arc-shaped bar 710.

In addition, as illustrated in FIG. 8, guide bars 810 fixed to the rear surface of each of the first and second keyboard units 110, 130 may be slidably coupled to a sliding groove 805 in the arc-shaped bar 710.

When the first and/or second keyboard units 110, 130 slide to certain positions respectively, at least one of the first and/or second keyboard units 110, 130 is rotated at a rotation angle suitable for the user's wrist angle. By downwardly rotating a fastening means such as a nut coupled to the guide bar 810 so as to suppress the sliding of the guide bar 810, the arrangement of the first and second keyboard units 110, 130 may be held.

Thereafter, by adjusting the height adjustment bar 820 provided at a plurality of positions on the rear surface of the first and/or second keyboard units 110, 130, respectively, height and tilt of the first and second keyboard units 110, 130 suitable for the user can be adjusted. The shape of the fastening means and the height adjustment bar 820 may be various. Although now shown, the same may apply to FIGS. 7 and 9.

FIGS. 7 and 8 illustrate the case where the holding member is the arc-shaped bar 710 while the holding member may be an articulated bar 910.

The articulated bar 910 consists of a plurality of shafts and a plurality of hinges configured for connecting adjacent shafts. After adjusting the shafts and the hinges so that the arrangement of the first and second keyboard units 110, 130 is appropriately adjusted, a fastening means such as a pin may be used to have the hinges not rotate.

The articulated bar 910 may be detachably attached to the rear surfaces of the first and second keyboard units 110 and 130 while each end of the articulated bar 910 may be fixed to the rear surfaces of the first and second keyboard units 110, 130 respectively.

As described above, the wireless keyboard device according to the present embodiment has a feature that the arrangement of the wireless keyboard selected by the user (that is, the relative position and rotation angle of the main keyboard unit and the sub keyboard unit) can be held by the holding member, thereby securing work stability as well as work convenience.

Figure 10:
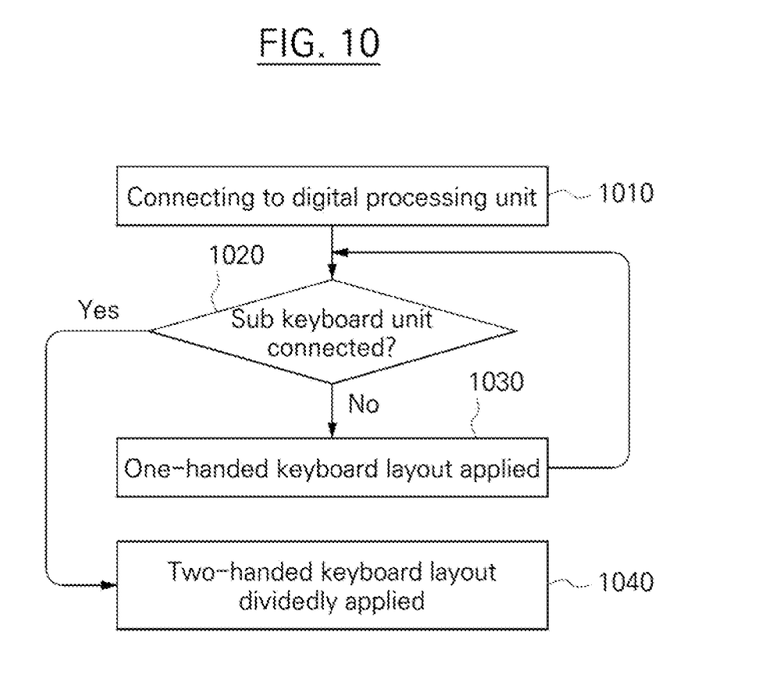
FIG. 10 is a flowchart illustrating a method of changing a keyboard layout for each communication connection of a wireless keyboard device according to an embodiment of the present invention.

FIG. 10 is a flowchart illustrating a method of changing a keyboard layout for each communication connection of a wireless keyboard device according to an embodiment of the present invention.

Referring to FIG. 10, in step 1010, any one of the wireless keyboard devices is set as the main keyboard unit by performing wireless connection with the digital processing device.

In step 1020, the main keyboard unit operates in an advertising mode so that another keyboard unit can access the main keyboard unit as a sub keyboard unit, and determines whether or not the sub keyboard unit is connected to the main keyboard unit.

In step 1030, if the sub keyboard unit is not connected, the main keyboard unit is set to apply the one-handed keyboard layout (see (a) of FIG. 5). Accordingly, the user manipulation using the main keyboard unit will be generated as manipulation data according to the one-handed keyboard layout and provided to the digital processing device.

In step 1040, if the sub keyboard unit is connected, the main keyboard unit is set to apply the two-handed keyboard layout that is dividedly applied to the main keyboard unit and the sub keyboard unit so that the main keyboard unit and the sub keyboard unit operate as one single wireless keyboard device (see (b) of FIG. 5).

In order to allow the physically separated main keyboard unit and sub keyboard unit to operate as the function as one single keyboard device, selection and deselection information on keys (e.g., combination key, input selection key and so on), which should be commonly applied when the main keyboard unit and the sub keyboard unit operate, are processed to be shared with each other.

It should be easily understood that each of the main keyboard unit and the sub keyboard unit may be set to operate in one-handed mode according to a user operation even when the sub keyboard unit is connected to the main keyboard unit.

It should be easily understood that the above-described method of changing the keyboard layout for each connection structure of the wireless keyboard device may be implemented as a software program or application embedded in the digital processing device and may be executed as an automated procedure according to a time-series sequence. Codes and code segments consisting of the program or the like can be easily inferred by a computer programmer in the art. In addition, the program is stored in a computer readable media, and is read and executed by a computer to implement the method.

While exemplary embodiments of the invention have been described above, it will be understood by those skilled in the art that the invention can be modified in various forms without departing from the spirit and scope of the invention described in the appended claims.

What is claimed is:

1. A separated keyboard device, comprising:
a main keyboard unit connected to a digital processing device by wire or wirelessly; and
a sub keyboard unit physically separated from the main keyboard unit and connected to the main keyboard unit by wire or wirelessly,
wherein a first keyboard layout for an operation in one-handed mode is applied when the sub keyboard unit is not connected while the main keyboard unit is connected to the digital processing device, the first keyboard layout defining a first logical arrangement of how each of a plurality of keys on the main keyboard unit corresponds to an associated letter, wherein a second keyboard layout for an operation in two-handed mode is applied to the main keyboard unit and the sub keyboard unit when the sub keyboard unit is connected while the main keyboard unit is connected to the digital processing device, the second keyboard layout defining a second logical arrangement of how each of a plurality of keys on the main keyboard unit corresponds to an associated letter, the second logical arrangement being different from the first logical arrangement, wherein the plurality of keys of the main keyboard unit are arranged to form a plurality of blocks when the main keyboard unit corresponds to the user's right hand, wherein the plurality of blocks comprises a main block consisting of a first plurality of the plurality of keys, a first outer block consisting of a second plurality of the plurality of keys, arranged adjacent to the right side of the main block at a lower side relatively closer to the user side than the main block, a second outer block consisting of a third plurality of the plurality of keys, arranged adjacent to the right side of the first outer block at a lower side relative to the first outer block, an inner block consisting of a fourth plurality of the plurality of keys, arranged adjacent to the left side of the main block at a lower side relative to the main block, and a lower block consisting of a fifth plurality of the plurality of keys, arranged at lower sides of the inner block and the main block, the fifth plurality of keys corresponding to a movement path of a thumb are arranged in a curved shape, wherein a touchpad is arranged below the main block and the first outer block and on the left side of the lower block.

2. The separated keyboard device of claim 1, wherein an arrangement of keys and touchpad of the sub keyboard unit is in a form in which the main keyboard unit is mirrored when the sub keyboard unit corresponds to the user's left hand.

3. The separated keyboard device of claim 1, wherein an e-paper display for displaying an operation allocated to a corresponding one of the plurality of keys according to the applied keyboard layout is arranged on a surface of each of the plurality of keys.

4. The separated keyboard device of claim 1, wherein a display for displaying an operation status and a setting status of the main keyboard unit or the sub keyboard unit is arranged in an area that does not interfere with the plurality of keys and the touchpad.

5. The separated keyboard device of claim 2, wherein the main keyboard unit recognizes a change in a relative contact position of a user's fingers in contact with the touchpad of the main keyboard unit and the touchpad of the sub keyboard unit respectively as a manipulation gesture and transmits manipulation data to the digital processing device.

6. The separated keyboard device of claim 1, wherein selection information and deselection information for an input selection key and a combination key in any one of the main keyboard unit and the sub keyboard unit are preset to be shared with the other.

7. The separated keyboard device of claim 1, wherein a relative position and a relative rotation angle of the main keyboard unit and the sub keyboard unit are held using a holding member.

8. The separated keyboard device of claim 7, wherein the holding member is at least one of an arc-shaped bar and an articulated bar.

9. The separated keyboard device of claim 8, wherein each of the main keyboard unit and the sub keyboard unit is coupled to the holding member so as to slide along a path formed in the holding member to a position to be held.

10. The separated keyboard device of claim 9, wherein the main keyboard unit operates in an advertising mode for establishing a wireless connection with the sub keyboard unit, and integrates manipulation data received from the sub keyboard unit with manipulation data generated by the main keyboard unit to transmit to the digital processing device.

11. The separated keyboard device of claim 1, wherein the main keyboard unit receives the second keyboard layout from the digital processing device and provides the second keyboard layout to the sub keyboard unit.

* * * * *